US006784928B1

(12) United States Patent
Sakurai et al.

(10) Patent No.: US 6,784,928 B1
(45) Date of Patent: Aug. 31, 2004

(54) SOLID STATE IMAGE PICKUP DEVICE AND SIGNAL READING METHOD THEREOF

(75) Inventors: Katsuhito Sakurai, Machida (JP); Shigetoshi Sugawa, Atsugi (JP); Isamu Ueno, Hadano (JP); Katsuhisa Ogawa, Machida (JP); Toru Koizumi, Yokohama (JP); Tetsunobu Kochi, Hiratsuka (JP); Hiroki Hiyama, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/210,997

(22) Filed: Dec. 15, 1998

(30) Foreign Application Priority Data

Dec. 25, 1997 (JP) .............................................. 9-357638

(51) Int. Cl.[7] .......................... H04N 5/225; H04N 3/14; H04N 5/335
(52) U.S. Cl. .................... 348/220.1; 348/283; 348/308; 348/316; 250/208.1
(58) Field of Search ................................ 348/322, 323, 348/321, 320, 319, 304, 303, 283, 282, 279, 273, 271, 266, 302, 333.01, 220.1, 308, 208.1, 281, 316

(56) References Cited

U.S. PATENT DOCUMENTS

| 4,453,177 | A | | 6/1984 | Berger et al. | |
|---|---|---|---|---|---|
| 4,603,354 | A | | 7/1986 | Hashimoto et al. | |
| 4,658,287 | A | * | 4/1987 | Chen | 348/281 |
| 4,928,137 | A | * | 5/1990 | Kinoshita | 348/297 |
| 4,959,723 | A | * | 9/1990 | Hashimoto | 348/302 |
| 5,043,819 | A | * | 8/1991 | Cheon et al. | 348/316 |
| 5,136,370 | A | * | 8/1992 | Chi | 348/279 |
| 5,148,013 | A | * | 9/1992 | Yamada | 250/208.1 |
| 5,153,731 | A | * | 10/1992 | Nagasaki et al. | 348/294 |
| 5,196,939 | A | * | 3/1993 | Elabd et al. | 348/314 |
| 5,249,041 | A | * | 9/1993 | Shiraishi | 348/224.1 |
| 5,264,939 | A | * | 11/1993 | Chang | 348/322 |
| 5,278,660 | A | * | 1/1994 | Sugiki | 348/305 |
| 5,418,565 | A | * | 5/1995 | Smith | 348/273 |
| 5,463,419 | A | * | 10/1995 | Saito | 348/231.9 |
| 5,486,859 | A | * | 1/1996 | Matsuda | 348/311 |
| 5,491,512 | A | * | 2/1996 | Itakura et al. | 348/321 |
| 5,493,335 | A | * | 2/1996 | Parulski et al. | 348/231.6 |
| 5,786,588 | A | * | 7/1998 | Takahashi | 250/208.1 |
| 5,880,781 | A | * | 3/1999 | Udagawa et al. | 348/279 |
| 5,990,946 | A | * | 11/1999 | Sakurai et al. | 348/222.1 |
| 6,011,583 | A | * | 1/2000 | Hieda et al. | 348/220.1 |
| 6,122,007 | A | * | 9/2000 | Ishibashi | 348/231.6 |
| 6,124,888 | A | * | 9/2000 | Terada et al. | 348/302 |
| 6,130,710 | A | * | 10/2000 | Yasuda | 348/220.1 |
| 6,275,261 | B1 | * | 8/2001 | Yamazaki | 348/273 |
| 6,449,013 | B1 | * | 9/2002 | Suzuki et al. | 348/279 |
| 6,529,236 | B1 | * | 3/2003 | Watanabe | 348/230.1 |

FOREIGN PATENT DOCUMENTS

| EP | 0 720 388 | 7/1996 |
|---|---|---|
| JP | 4-337983 | 11/1992 |
| JP | 04-337983 | 11/1992 |
| JP | 5-91416 | 4/1993 |
| JP | 05-91416 | 4/1993 |
| JP | 9-46715 | 2/1997 |

* cited by examiner

Primary Examiner—Andrew Christensen
Assistant Examiner—Brian Genco
(74) Attorney, Agent, or Firm—Fitzpatrick, Cella, Harper & Scinto

(57) ABSTRACT

A solid state image pickup device has a drive unit with an all pixel drive mode for reading all pixels in a horizontal direction and a pixel skip drive mode for reading pixels in the horizontal direction by skipping some pixels, and a plurality of read-out systems for reading pixels. In the all pixel drive mode, signals of pixels are divisionally read by the plurality of read-out systems, and in the pixel skip drive mode, signals of pixels are read by one of the plurality of read-out systems. In this manner, in the pixel skip drive mode, the power consumption can be reduced and a difference between output signal levels to be caused by a variation in characteristics of elements of the read-out system can be suppressed.

6 Claims, 13 Drawing Sheets

STILL IMAGE MODE

MOVING IMAGE MODE

FIG. 15A

| G | Ye | Mg | Cy |
|---|----|----|----|
| Mg | Cy | G | Ye |
| Cy | G | Ye | Mg |
| Ye | Mg | Cy | G |

| G | Ye | Mg | Cy |
|---|----|----|----|
| Mg | Cy | G | Ye |
| Cy | G | Ye | Mg |

| G | Ye |
|---|----|
| Mg | Cy |
| Cy | G |
| Ye | Mg |

— Mg+Cy
— Cy+G
— Ye+Mg

SOLID STATE IMAGE PICKUP DEVICE AND SIGNAL READING METHOD THEREOF

BACKGROUND OF THE INVENTION

1. Field of the Invention

The present invention relates to a solid state image pickup device and signal reading method thereof, and more particularly to a solid state image pickup device having a drive mode for reading all pixels, a drive mode for reading pixels by skipping some pixels, and a plurality of read-out systems for reading pixels.

2. Related Background Art

In a solid state image pickup device having a plurality of solid state image pickup elements constituting a plurality of pixels, in order to read signals from pixels at high speed and eliminate the restrictions on mounting elements on a substrate or the like, a plurality (e.g., two) of read-out systems are provided to divisionally read signals from the pixel array at the same time.

Such a solid state image pickup device can read signals at high speed, and since the read-out systems can be disposed separately, the restrictions on mounting elements on a substrate can be eliminated. Regardless of these and other advantages, however, a power consumption increases because of provision of a plurality of read-out systems, and signal outputs from the read-out systems may include difference therebetween due to a variation in characteristics of elements of the read-out systems.

SUMMARY OF THE INVENTION

An object of the invention is to reduce a power consumption of a solid state image pickup device.

Another object of the present invention is to suppress a variation in output signal levels, caused by a variation in characteristics of elements of a solid state image pickup device.

In order to achieve the above objects, according to a preferable embodiment of the invention, there is provided a solid state image pickup device comprising: driving means having an all pixel drive mode for reading all pixels in a horizontal direction and a pixel skip drive mode for reading pixels in the horizontal direction by skipping some pixels; and a plurality of read-out systems for reading pixels, wherein in the all pixel drive mode, signals of pixels are divisionally read by the plurality of read-out systems, and in the pixel skip drive mode, signals of pixels are read by one of the plurality of read-out systems.

According to another embodiment of the invention, there is provided a solid state image pickup device comprising: driving means having an all pixel drive mode for reading all pixels in a horizontal direction and a pixel skip drive mode for reading pixels in the horizontal direction by skipping some pixels; a plurality of read-out systems for reading pixels; and switching means for connecting pixels connected to at least one read-out system to another read-out system, wherein in the all pixel drive mode, signals of pixels are divisionally sent to the plurality of read-out systems, and in the pixel skip drive mode, signals of pixels connected to at least one read-out system are sent to the other read-out system by using the switching means.

According to another embodiment of the invention, there is also provided a signal reading method for a solid state image pickup device having a plurality of read-out systems for reading pixels, comprising an all pixel drive mode for reading all pixels in a horizontal direction, and a pixel skip drive mode for reading pixels in the horizontal direction by skipping some pixels, wherein in the all pixel drive mode, signals of pixels are divisionally read by the plurality of read-out systems, and in the pixel skip drive mode, signals of pixels are read by one of the plurality of read-out systems.

According to another embodiment of the invention, there is also provided a signal reading method for a solid state image pickup device having a plurality of read-out systems for reading pixels, comprising an all pixel drive mode for reading all pixels in a horizontal direction, and a pixel skip drive mode for reading pixels in the horizontal direction by skipping some pixels, wherein in the all pixel drive mode, signals of pixels are read by using the plurality of read-out systems in parallel, and in the pixel skip drive mode, signals of pixels connected to at least one of the plurality of read-out systems are read by using another of the plurality of read-out systems.

Other objects and features of the invention will become apparent from the following specification and drawings.

BRIEF DESCRIPTION OF THE DRAWINGS

FIGS. 15A, 15B, and 15C are diagrams showing other layouts of color filters.

DETAILED DESCRIPTION OF THE PREFERRED EMBODIMENTS

Embodiments of the invention will be described with reference to the accompanying drawings. Prior to describing the embodiments, the technical background upon which the invention is based will be described.

In an apparatus having a mode for reading signals from all pixels in a pixel array, e.g., a still image pickup mode for a digital camera, signals are divisionally read from a plurality of read-out systems in order to speed up a read time. If such a circuit configuration of divisionally reading signals from a plurality of read-out systems is adopted, even in a mode of reading signals by skipping some pixels as disclosed in Japanese Patent Application Laid-Open No. 9-46715, signals are divisionally read from the read-out systems.

However, as already described, a power consumption increases because of provision of a plurality of read-out systems, and signal levels output from the read-out systems may be different from each other due to a variation in characteristics of elements of the read-out systems.

In such a pixel skip read mode, the number of read pixels is smaller than that in the all pixel read mode. From this viewpoint, in the pixel skip read mode of the invention, the present invention sends signals read from pixels connected to at least one read-out system to other read-out systems.

An apparatus using a solid state image pickup device having the all pixel read mode and pixel skip read mode is, for example, a digital camera with an electronic view finder (EVF). EVF displays a moving image in the pixel skip read mode, whereas when images are actually photographed, the camera operates in the all pixel read-mode.

Now, the embodiments of the invention will be described with reference to the accompanying drawings.

Figure 1:
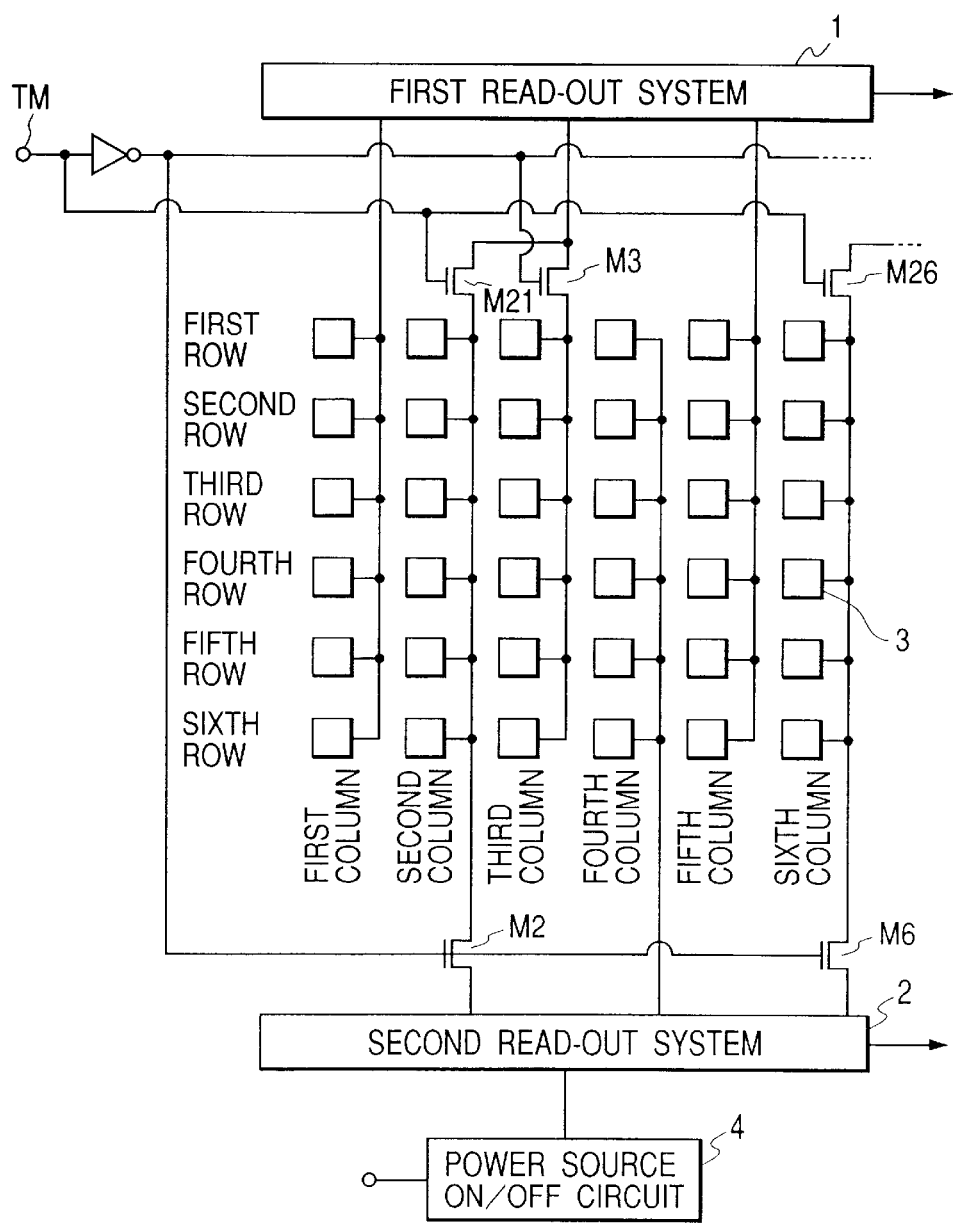
FIG. 1 is a schematic and illustrative diagram showing a circuit configuration according to a first embodiment of the invention.
Figure 2:
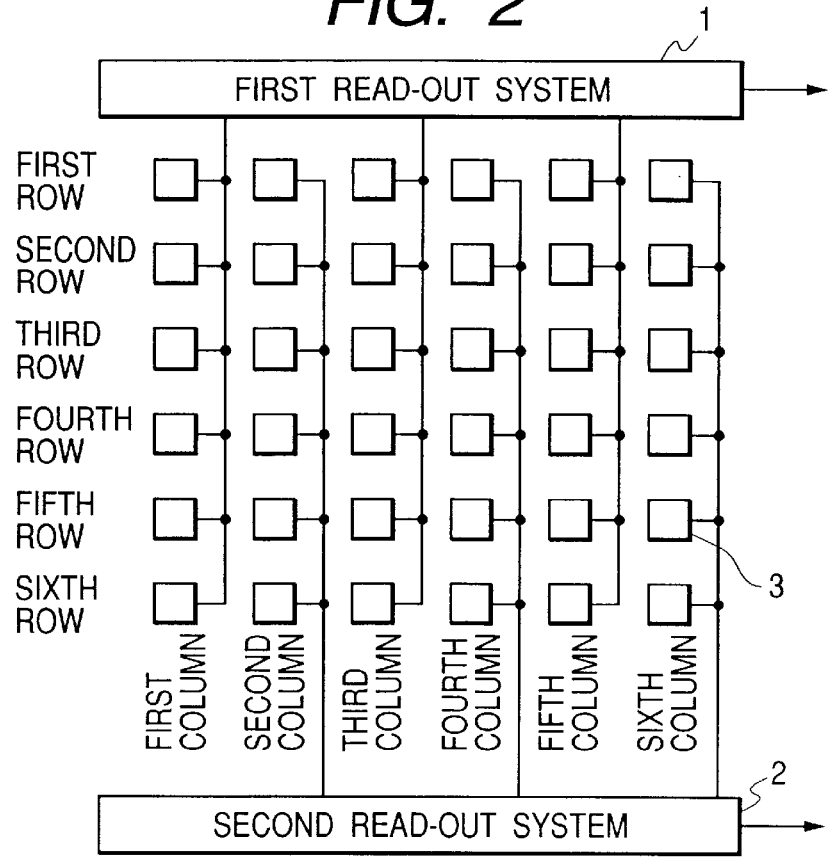
FIG. 2 is a schematic and illustrative diagram showing the circuit configuration for reading signals with two read-out systems.

First, common technical matters of the first to third embodiments will be explained. FIG. 1 is a schematic and illustrative diagram showing the embodiment of the invention, and FIG. 2 is a schematic and illustrative diagram showing the circuit configuration of reading signals with two read-out systems. A pixel array shown is constituted of 6×6 pixels, for the purpose of simplicity. In the following, it is assumed that a pixel skip read is performed along the column line (vertical line).

Referring to FIGS. 1 and 2, reference numeral 3 represents a pixel in the pixel array of 6×6. Of pixels disposed in the column direction, the pixels of the odd number columns are connected via respective vertical output lines to a first read-out system 1, and the pixels of the even number columns are connected via respective vertical output lines to a second read-out system 2. In the first embodiment shown in FIG. 1, switching means constituted of MOS transistors M21, M3, M26, M7 (not shown), M2 and M6 are provided to select one of the second and third column pixels and one of the sixth and seventh (not shown) column pixels and to connect the selected ones to the first read-out system 1. MOS transistors M2 and M6 are used to disconnect the second and sixth column pixels connected to the first read-out system, from the second read-out system.

In reading signals in the configuration shown in FIG. 2, signals of the odd column pixels are read via the first read-out system 1 sequentially one line after another, whereas signals of the even column pixels are read via the second read-out system 2 sequentially one line after another. This fundamental read method is applied to both the all pixel read mode and the pixel skip read mode. Specifically, in the all pixel read mode, the first, third, fifth, . . . column pixels are read from the first read-out system 1, and the second, fourth, sixth, . . . column pixels are read from the second read-out system 2. In the pixel skip read mode, the first, fifth, . . . column pixels are read from the first read-out system 1, and the second, sixth, . . . column pixels are read from the second read-out system 2.

Considering the fact that the number of read pixels in the pixel skip read mode is smaller than that in the all pixel read mode (the number is halved in the pixel skip read mode on the 2-column and 2-row unit skip basis), the invention includes the switching means which allows the second, sixth, . . . column pixels to be connected to the first read-out system during the pixel skip read mode, so that signals are read only from the first read-out system.

A more specific description will be given with reference to FIG. 1. In the all pixel read mode, an L level signal is applied to a terminal TM to turn on MOS transistors M3, M2, and M6 and turn off MOS transistors M21 and M26 to thereby transfer signals from the first, third, and fifth column pixels to the first read-out system 1 and transfer signals from the second, fourth, and sixth column pixels to the second read-out system 2. This circuit configuration described above is the same as that shown in FIG. 2.

Figure 3:
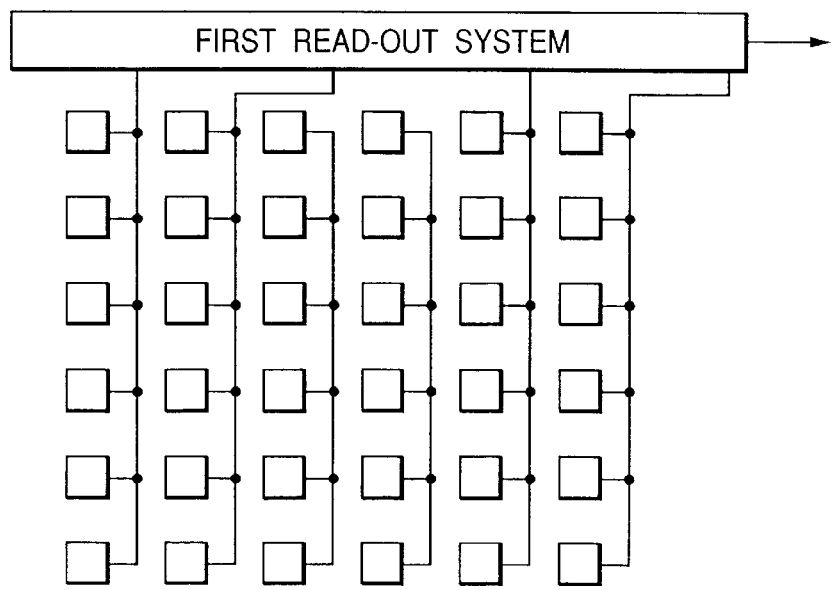
FIG. 3 is a schematic and illustrative diagram showing the circuit configuration for reading signals by skipping some pixels.

In the pixel skip read mode, an H level signal is applied to the terminal TM to turn on the switching means M21 and M26 and turn off the switching means M3, M2, and M6 to thereby read signals from the first, second, fifth, sixth, . . . column pixels and transfer the signals to the first read-out system 1. In this case, signals from the second column pixels are transferred via the third column vertical output line to the first read-out system 1, and signals from the sixth column pixels are transferred via the seventh column vertical. output line (not shown) to the first read-out system 1. An equivalent circuit of the configuration described above is shown in FIG. 3.

In the pixel skip read mode, a low power consumption of the apparatus can be realized by turning off a power source or sources applying a voltage or voltages to a portion or the whole of the second read-out system 2 with the power on/off circuit 4 shown in FIG. 1, or by reducing a consumption current or currents supplied to a portion or the whole of the second read-out system 2.

Furthermore, since pixels are read by using one read-out system, a variation in characteristics of elements constituting the two read-out systems is not necessary to be taken into consideration.

The solid state image pickup device described above uses mainly a MOS type solid state image pickup device in the above embodiment. The invention is also applicable to a CCD type solid state image pickup device.

Figure 4:
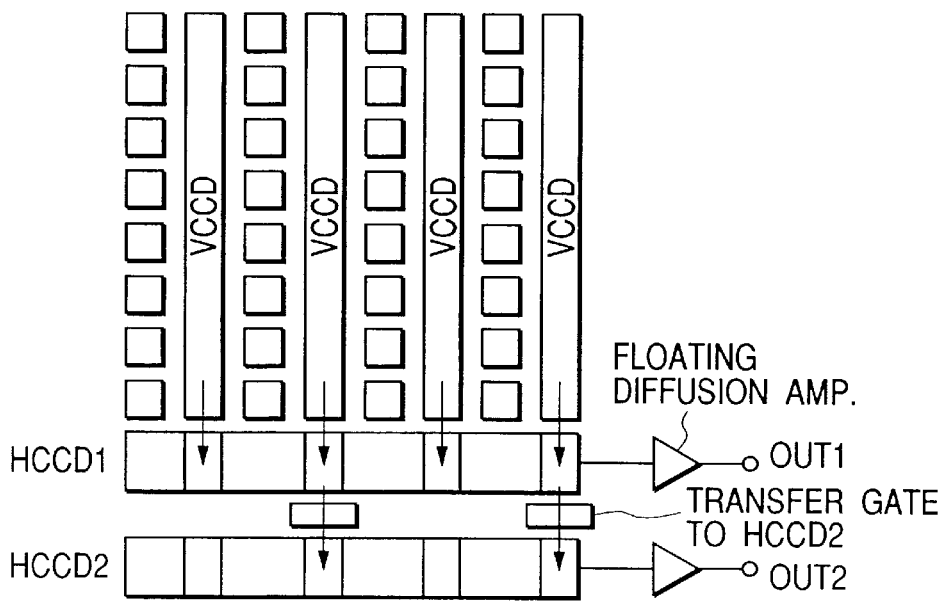
FIG. 4 is a schematic and illustrative diagram showing a circuit configuration in a still image mode according to a second embodiment of the invention.
Figure 5:
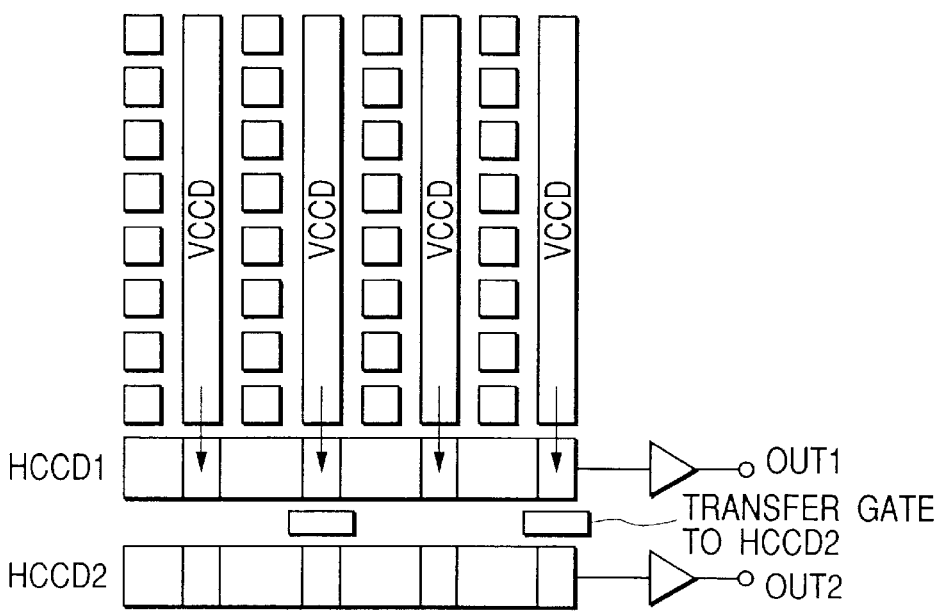
FIG. 5 is a schematic and illustrative diagram showing the circuit configuration of the second embodiment in a moving image mode.

In a CCD type solid state image pickup device, two read-out systems are disposed in parallel as shown in FIGS. 4 and 5. In a still image mode shown in FIG. 4, all pixels are read. In this case, signals of odd column pixels are read via vertical CCD's (VCCD's) to a first read-out ;system 1 made of a horizontal CCD (HCCD), and signals of even column pixels are read via VCCD's and HCCD 1 to a second read-out system 2 made of an HCCD. In a moving image mode shown in FIG. 4, the pixel skip read mode is performed (e.g., photoelectrically converted carriers of two horizontal lines are transferred to VCCD's every second lines, as disclosed in Japanese Patent Application Laid-Open No. 9-46715) to read signals from the first read-out system HCCD 1. As already described, since the number of read pixels is smaller in the pixel skip read mode than in the all pixel read mode, the signals of pixels can be read with a single read-out system. A power consumption can therefore be reduced by turning off the power sources for the transfer clocks and floating diffusion amplifier of HCCD 2. Furthermore, since pixels are read by using one read-out system, a variation in characteristics of elements constituting the two read-out systems is not necessary to be taken into consideration.

Next, the first embodiment of the invention will be described with reference to the accompanying drawings.

First, an example of a layout of color filters of a solid state image pickup device having the pixel skip read mode will be described specifically. An example of a layout of color filters of a solid state image pickup device having the pixel skip read mode is disclosed in Japanese Patent Application Laid-Open No. 9-46715.

Figure 6:
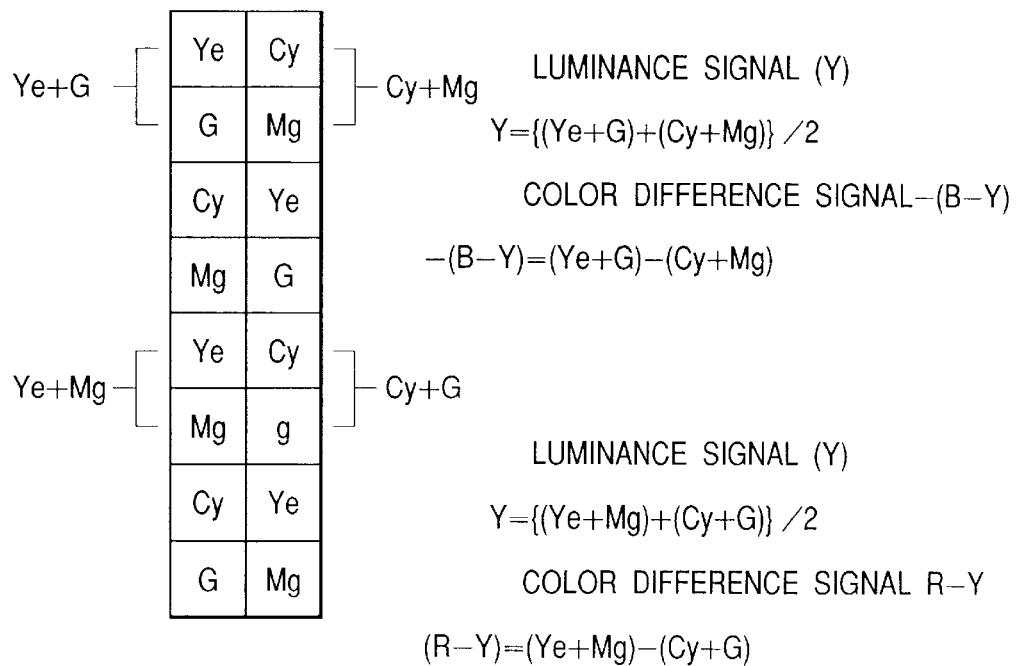
FIGS. 6A and 6B are diagrams illustrating a layout of color filters and a signal processing method.

FIGS. 6A and 6B are diagrams illustrating a layout of color filters disclosed in Japanese Patent Application Laid-Open No. 9-46715 and a signal processing method. In the layout of color filters shown in FIG. 6A, signals of the first row, first column Ye (yellow: which cuts blue light), the first row, second column Cy (cyan: which cuts red light), the second row, first column G (green: which transmits green light), and the second row, second column Mg (magenta: which cuts green light) are read. From the read signals, addition signals (Ye+G) and (Cy+Mg) are obtained. A luminance signal (Y) and a color difference signal (−(B−Y)) are calculated from the following equations:

$$Y=\{(Ye+G)+(Cy+Mg)\}/2 -(B-Y)=(Ye+G)-(Cy+Mg)$$

After the third and fourth rows are skipped, signals of the fifth row, first column Ye, the fifth row, second column Cy, the sixth row, first column Mg, and the sixth row, second column G are read. From the read signals, addition signals (Ye+Mg) and (Cy+G) are obtained. A luminance signal (Y) and a color difference signal (R−Y) are calculated from the following equations:

$$Y=\{(Ye+Mg)+(Cy+G)\}/2$$

$$R-Y=(Ye+Mg)-(Cy+G)$$

In the first embodiment, as described above, signals of respective two rows, i.e., the first and second, fifth and sixth, . . . row pixels are read in the row direction (horizontal direction) by skipping the third and fourth, seventh and eighth, . . . row pixels, and signals of respective two columns, i.e., the first and second, fifth and sixth, . . . column pixels are read in the column direction (vertical direction) by skipping the third and fourth, seventh and eighth, . . . column pixels.

Next, the structure and operation of a solid state image pickup device of the first embodiment having the layout of color filters described above will be described.

Figure 7:
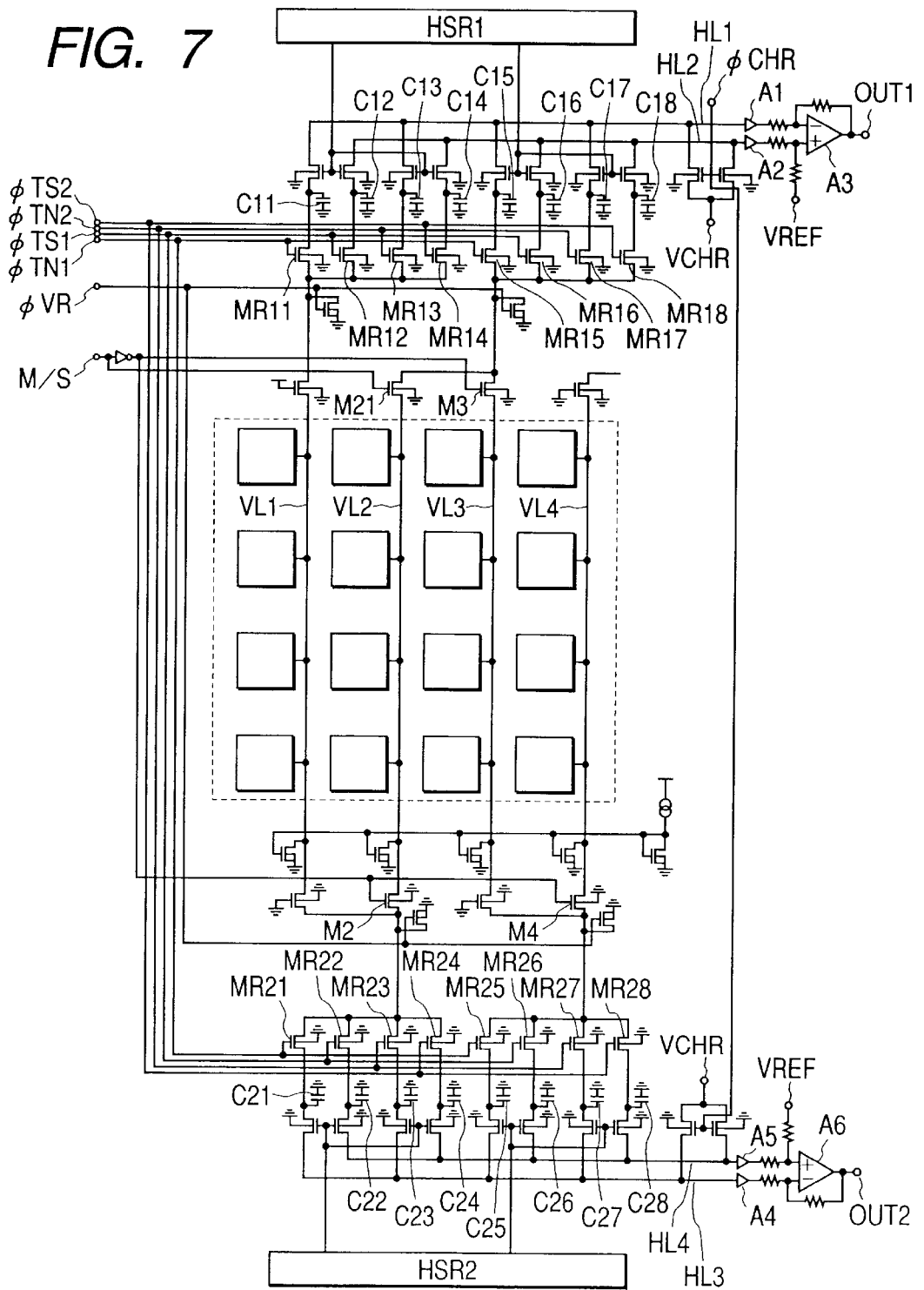
FIG. 7 is a diagram of a pixel array and read-out systems of a solid state image pickup device according to the first embodiment of the invention.
Figure 8:
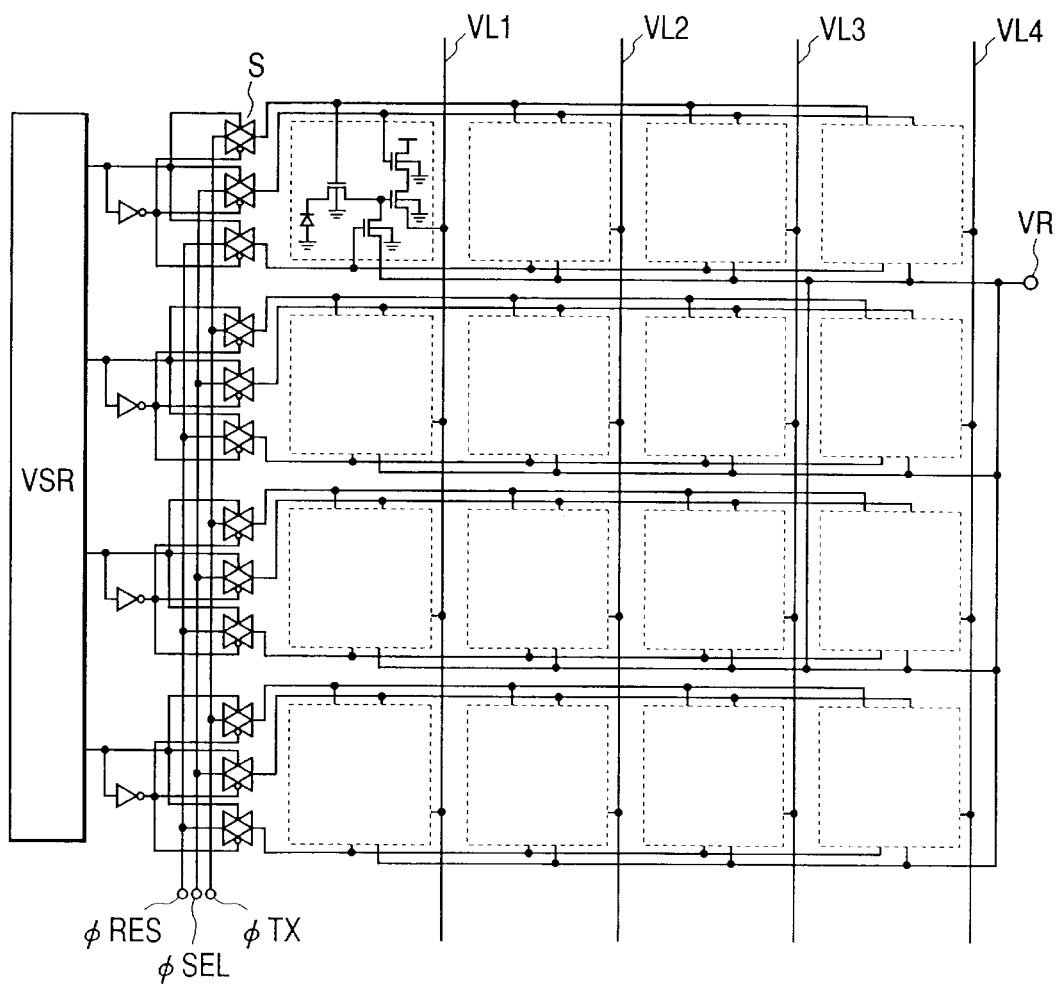
FIG. 8 is a diagram showing the pixel array shown in FIG. 7 and a vertical scan circuit.
Figure 9:
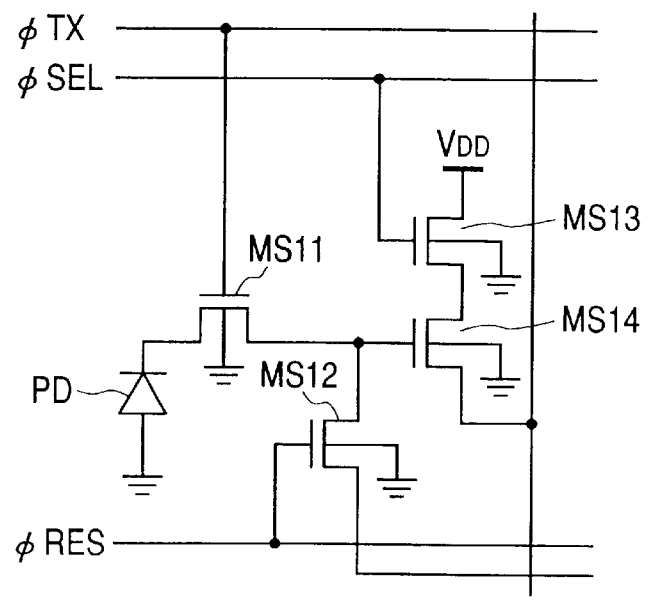
FIG. 9 is a diagram showing the configuration of one pixel.
Figure 10:
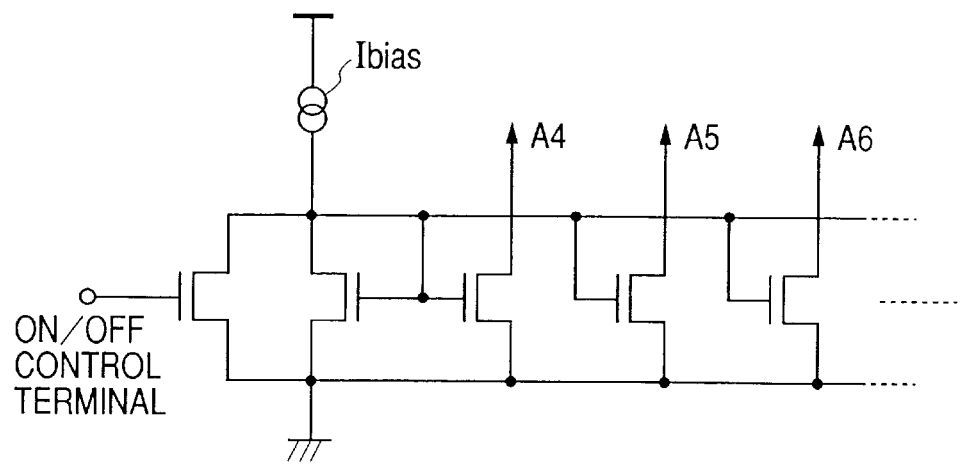
FIG. 10 is a diagram showing an example of a power on/off circuit.

FIG. 7 shows the pixel array and read-out systems of the solid state pickup device, FIG. 8 shows the pixel array and a vertical scanning means of the solid state pickup device shown in FIG. 7, FIG. 9 is a diagram showing the structure of one pixel, and FIG. 10 is a diagram showing an example of a power on/off circuit.

As shown in FIG. 9, one pixel is constituted of: a phototransistor PD, a transfer means MS11 for transferring signal charges of the phototransistor PD; a amplifying means MS14 for amplifying the transferred signal and outputting it; a select means MS13 for selecting the pixel; and a reset means MS12 for resetting the transferred signal to a potential VR. Signals φTX, φRES, and φSEL control the transfer means MS11, reset means MS12, and select means MS13, respectively.

As shown in FIG. 8, pixels each having the above configuration are disposed in a matrix. A vertical scanning circuit VSR sequentially drives each row provided with three switches S to apply the signals φRES, φTX, and φSEL to pixels of the selected row.

As shown in FIG. 7, pixels in respective columns of the pixel array shown in FIG. 8 are connected to vertical output lines VL1 to VL4 which are connected via corresponding four MOS transistors MR11 to MR14, MR21 to MR24, MR15 to MR18, and MR25 to MR28 to corresponding four capacitors C11 to C14, C21 to C24, C15 to C18, and C25 to C28. The MOS transistors MR11, MR15, MR21, and MR25 are controlled by the signal φTN1, the MOS transistors MR12, MR16, MR22, and MR26 are controlled by the signal φTS1, the MOS transistors MR13, MR17, MR23, and MR27 are controlled by the signal φTN2, and the MOS transistors MR14, MR18, MR24, and MR28 are controlled by the signal φTS2. These signals φTN1, φTS1, φTN2, and φTS2 select corresponding MOS transistors to store a signal of each pixel in the corresponding capacitor. The vertical output lines of the odd number columns are connected via the MOS transistors to the capacitors disposed in the upper area of FIG. 7, and the vertical output lines of the even number columns are connected via the MOS transistors to the capacitors disposed in the lower area of FIG. 7.

Similar to FIG. 1, MOS transistors M21, M3, and M2 are provided for selecting either the second or third column pixels (also either the sixth or seventh column pixels, and so on). If the MOS transistor M21 turns on, the MOS transistor M3 turns off so that signals of the pixels connected to the vertical output line VL2 are read from the vertical output line VL3. If the MOS transistor M3 is selected, the MOS transistor M21 turns off and the MOS transistor M2 turns on so that signals of the pixels connected to the vertical output line VL2 are read directly from the vertical output line VL2.

A first horizontal scanning circuit (HSR1) operates to simultaneously transfer signals in the capacitors C11 and C13 to a horizontal output line HL1 and signals in the capacitors C12 and C14 to a horizontal output line HL2. These signals are amplified by amplifiers A1 and A2, and a differential amplifier A3 outputs from its output terminal OUT1 a subtraction signal (V2−V1) where V1 is an addition signal of the signals in the capacitors C11 and C13, and V2 is an addition signal of the signals in the capacitors C12 and C14.

When the MOS transistor M21 turns on and the MOS transistor M2 turns off, signals of the pixels connected to the vertical output line VL2 are read from the vertical output line VL3. In this case, the first horizontal scanning circuit (HSR1) operates to simultaneously transfer signals in the capacitors C15 and C17 to the horizontal output line HL1 and signals in the capacitors C16 and C18 to the horizontal output line HL2. These signals are amplified by the amplifiers A1 and A2, and the differential amplifier A3 outputs from its output terminal OUT1 a subtraction signal (V4−V3) where V3 is an addition signal of the signals in the capacitors C15 and C17, and V4 is an addition signal of the signals in the capacitors C16 and C18. During these operations, power sources connected to amplifiers A4, A5, and A6 are turned off by using a power on/off circuit (not shown in FIG. 7) such as shown in FIG. 10. Clocks input to a horizontal scanning circuit HSR2 are also turned off.

When the MOS transistor M21 turns off and the MOS transistor M2 turns on, the second horizontal scanning circuit HSR2 operates to simultaneously transfer signals in the capacitors C21 and C23 to a horizontal output line HL3 and signals in the capacitors C22 and C24 to a horizontal output line HL4. These signals are amplified by the amplifiers A4 and A5, and the differential amplifier A6 outputs from its output terminal OUT2 a subtraction signal (V6−V5) where V5 is an addition signal of the signals in the capacitors C21 and C23, and V6 is an addition signal of the signals in the capacitors C22 and C24.

Potentials of the horizontal output lines HL1, HL2, HL3, and HL4 of the two read-out systems may fluctuate because of parasitic capacitances or the like. In order to make the potentials equal to each other, reset MOS switches are provided as shown in FIG. 7. These MOS switches are controlled by a signal φCHR to set the potentials of the horizontal output lines to a potential VCHR.

The operation of the above-described solid state image pickup device used with a digital camera will be described with reference to FIGS. 11 and 12. In the still image mode, all pixels are read, and in the moving image mode, pixels are read while some pixels are skipped. In the following description, FIGS. 7 to 10 are referred to as to the structure of the solid state image pickup device. For the simplicity of description, only the operation of reading pixels of the first and second rows and first and second columns will be described.

Figure 11:
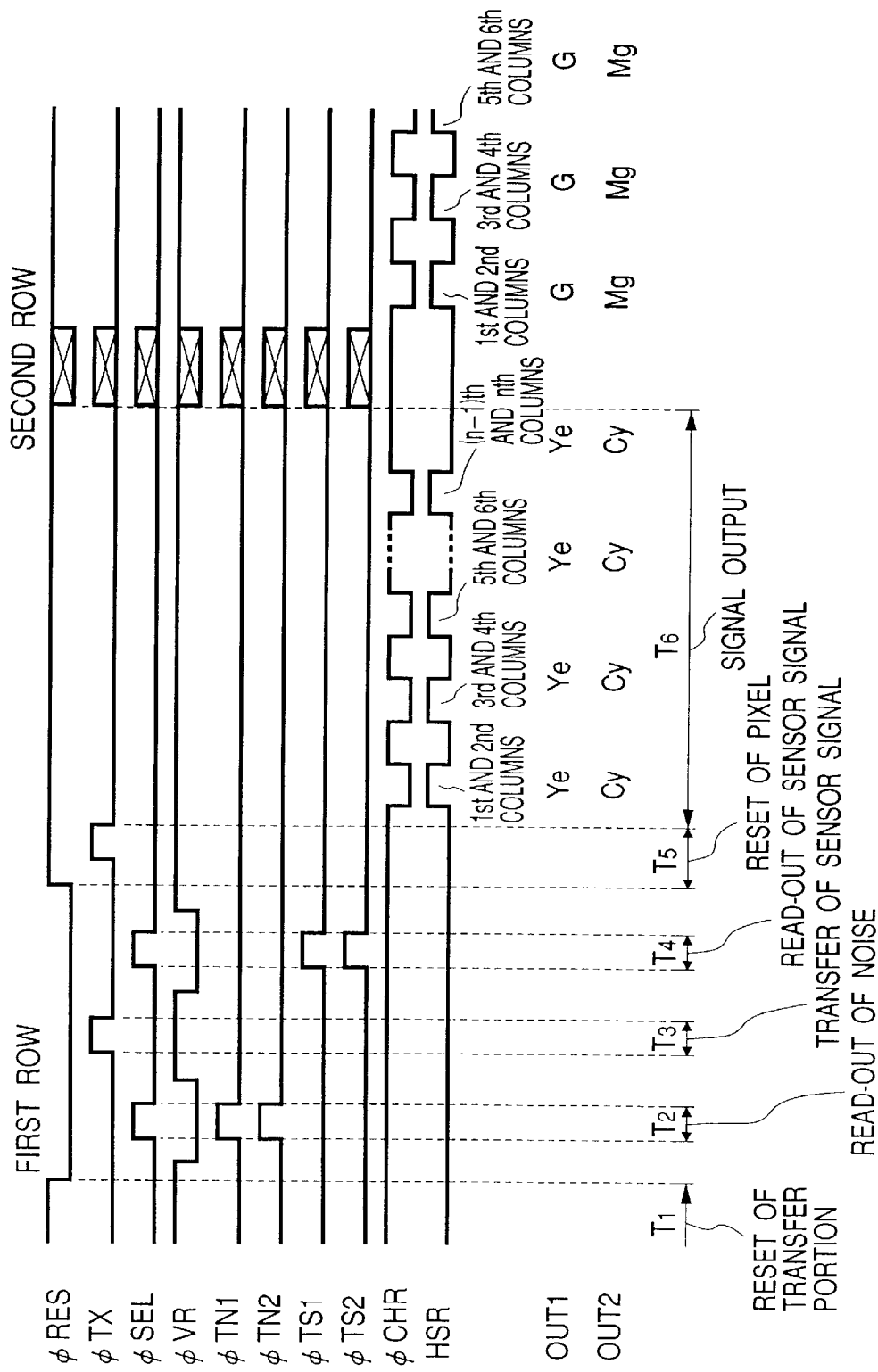
FIG. 11 is a timing chart illustrating an operation in a still image mode.

In the still image mode, as shown in FIG. 11, the reset signal φRES for the first row pixels is set to the L level to release the reset operation (transfer section reset period T1) of the transfer section (excluding the photodiode) of each pixel. Next, the signals φSEL, φTN1, and φTN2 are set to the H level to read noise signals in the pixels into the two capacitors (noise read period T2). The signals of the first column pixels are read into the capacitors C11 and C13 in the upper area of FIG. 7 (by the first read-out system), and the signals of the second column pixels are read into the capacitors C21 and C23 in the lower area of FIG. 7 (by the second read-out system).

Next, the signal φVR is set to the H level to reset the vertical output lines. During this reset period, the signal φTX is set to the H level to transfer sensor signals from the phototransistors (PD) of pixels in which signal charges are accumulated (sensor signal transfer period T3). Next, the signals φSEL, φTS1, and φTS2 are set to the H level to read sensor signals in the pixels into the two capacitors (sensor signal read period T4). The signals of the first column pixels are read into the capacitors C12 and C14 in the upper area of FIG. 7 (by the first read-out system), and the signals of the second column pixels are read into the capacitors C22 and C24 in the lower area of FIG. 7 (by the second read-out system). Signals in the third column and following column pixels are also read at this time.

Next, the reset signal φRES for the pixels in the first row is set to the H level to reset the transfer sections of the pixels, and the signal φTX is also set to the H level to reset the photodiodes of the pixels (pixel reset period T5).

During a next signal output period T6, on the side of the first read-out system, an addition signal of noise signals in the first row, first column pixels is read from the capacitors C11 and C13 to the horizontal output line HL1, and an addition signal of sensor signals in the first row, first column pixels is read from the capacitors C12 and C14 to the horizontal output line HL2. The addition signal of sensor signals subtracted by the addition signal of noise signals is output from the output terminal OUT1. On the side of the second read-out system, an addition signal of noise signals in the first row, second column pixels is read from the capacitors C21 and C23 to the horizontal output line HL3, and an addition signal of sensor signals in the first row, second column pixels is read from the capacitors C22 and C24 to the horizontal output line HL4. The addition signal of sensor signals subtracted by the addition signal of noise signals is output from the output terminal OUT2. As shown in FIG. 11, an output of the first column pixels (OUT1) and an output of the second column pixels (OUT2) are output at the same time, and the outputs of the third and fourth column pixels and also following column pixels are also output at the same time. During a period between the first and second columns and the third and fourth columns (also between following column pairs), the signal φCHR is set to the H level to reset the horizontal output lines.

The operations similar to the above operations are repeated for the second and following rows. During a period between the first and second row operations (also between following row operations), the capacitors C11 to C18 and the capacitors C21 to C28 are reset.

Figure 12:
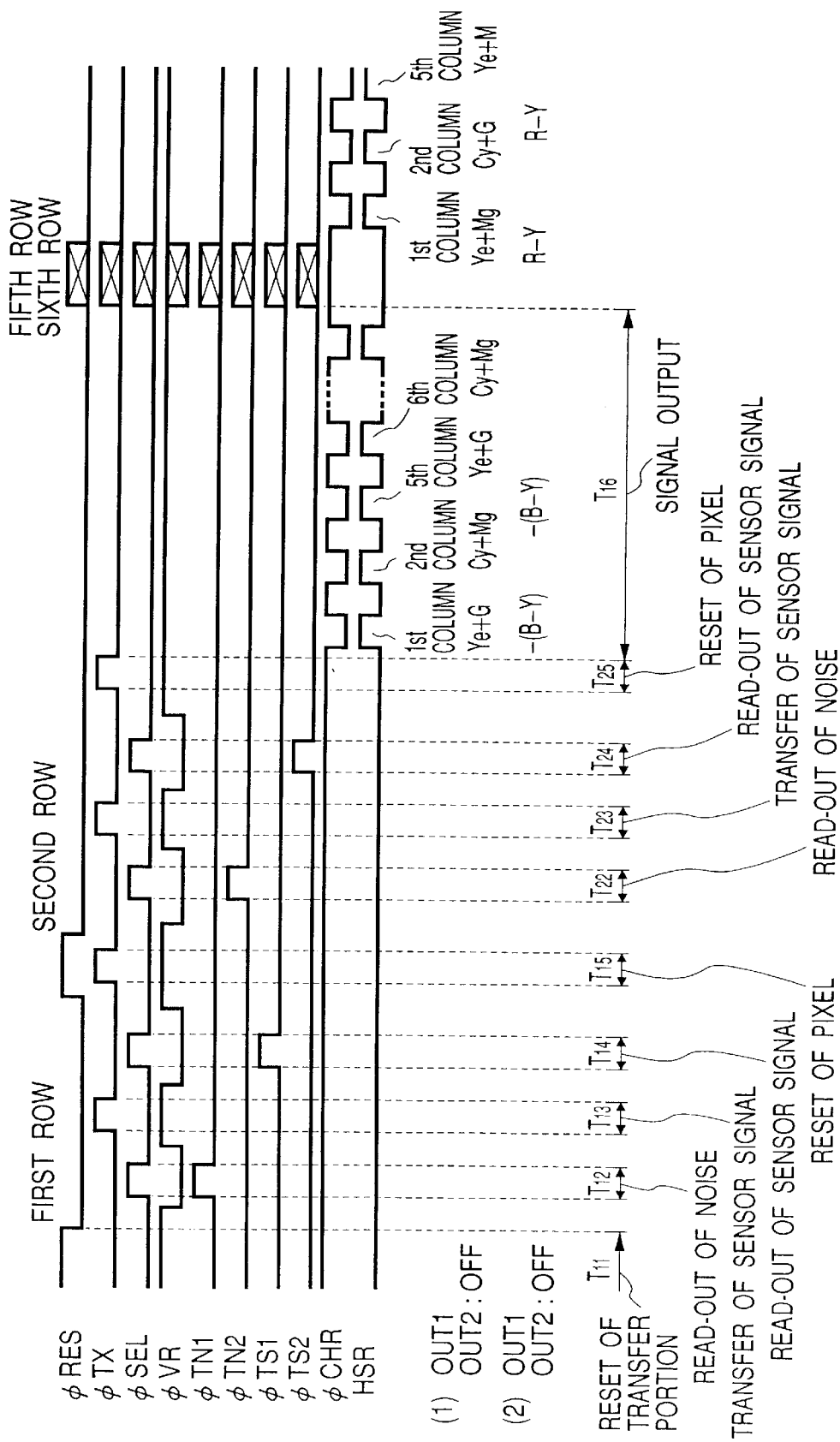
FIG. 12 is a timing chart illustrating an operation in a moving image mode.

In the moving image mode, as shown in FIG. 12, the reset signal φRES for the first row pixels is set to the L level to release the reset operation (transfer section reset period T11) of the transfer section (excluding the photodiode) of each pixel. Next, the signals φSEL and φTN1 are set to the H level to read a noise signal in the first column pixel into the capacitor C11 and a noise signal in the second column pixel into the capacitor C15 (noise read period T12). Next, the signal φVR is set to the H level to reset the vertical output lines. During this rest period, the signal φTX is set to the H level to transfer sensor signals from the phototransistors (PD) of pixels in which signal charges are accumulated (sensor signal transfer period T13). Next, the signals φSEL and φTS1 are set to the H level to read a sensor signal in the first column pixel into the capacitor C12 and a sensor signal in the second column pixel into the capacitor C16 (sensor signal read period T14). Signals in the fifth and following column pixels are also read at this time.

Next, the reset signal φRES for the pixels in the first row is set to the H level to reset the transfer sections of the pixels, and the signal φTX is also set to the H level to reset the photodiodes of the pixels (pixel reset period T15).

Next, signals in the second row pixels are read in the manner similar to reading signals of the first row pixels (periods T22 to T25 correspond to periods T12 to T15). A noise signal in the second row, first column pixel is read into the capacitor C13, a noise signal in the second row, second column pixel is read into the capacitor C17. A sensor signal in the second row, first column pixel is read into the capacitor C14, a sensor signal in the second row, second column pixel is read into the capacitor C18.

With the above operations, the noise signal and sensor signal in the first row, first column pixel are stored in the capacitors C11 and C12, respectively, and the noise signal and sensor signal in the first row, second column pixel are stored in the capacitors C15 and C16, respectively. The noise signal and sensor signal in the second row, first column pixel are stored in the capacitors C13 and C14, respectively, and the noise signal and sensor signal in the second row, second column pixel are stored in the capacitors C17 and C18, respectively.

During a next signal output period T16, for the first column pixel read, an addition signal of noise signals in the first row, first column pixel and the second row, first column pixel is read from the capacitors C11 and C13 to the horizontal output line HL1, and an addition signal of sensor signals in the first row, first column pixel and the second row, first column pixel is read from the capacitors C12 and C14 to the horizontal output line HL2. The row addition signal of sensor signals in the first row, first column pixel and the second row, first column pixel subtracted by the row addition signal of noise signals in the first row, first column pixel and the second row, first column pixel is output from the output terminal OUT1. Thereafter, for the second column pixel read, an addition signal of noise signals in the first row, second column pixel and the second row, second column pixel is read from the capacitors C15 and C17 to the horizontal output line HL1, and an addition signal of sensor signals in the first row, second column pixel and the second row, second column pixel is read from the capacitors C16 and C18 to the horizontal output line HL2. The row addition signal of sensor signals in the first row, second column pixel and the second row, second column pixel subtracted by the row addition signal of noise signals in the first row, second column pixel and the second row, second column pixel is output from the output terminal OUT1. With reference to the layout of color, filters shown in FIGS. 6A and 6B, a signal (Ye+G), from the first column pixels and a signal (Cy+Mg) from the second column pixels are output from the output terminal OUT1. Similar row addition signals are output for the fifth and sixth column pixels and following pixels.

After the third and fourth rows are skipped, similar operations are performed for the sixth row. A signal (Ye+Mg) is output from the first column pixels and a signal (Cy+G) is output from the second column pixels. This is illustrated in FIG. 12 as (1) OUT1, OUT2: OFF. Since the signals (Ye+G), (Cy+Mg), (Ye+Mg), and (Cy+G) are obtained from the first and the second rows and the fifth and sixth rows, the luminance signal (Y) and color difference signals (−(B−Y)) and (R−Y) can be obtained through the signal processing described earlier.

In the second embodiment of the invention, the color difference signals (−(B−Y)) and (R−Y) can be output from the output terminal OUT1.

Figure 13:
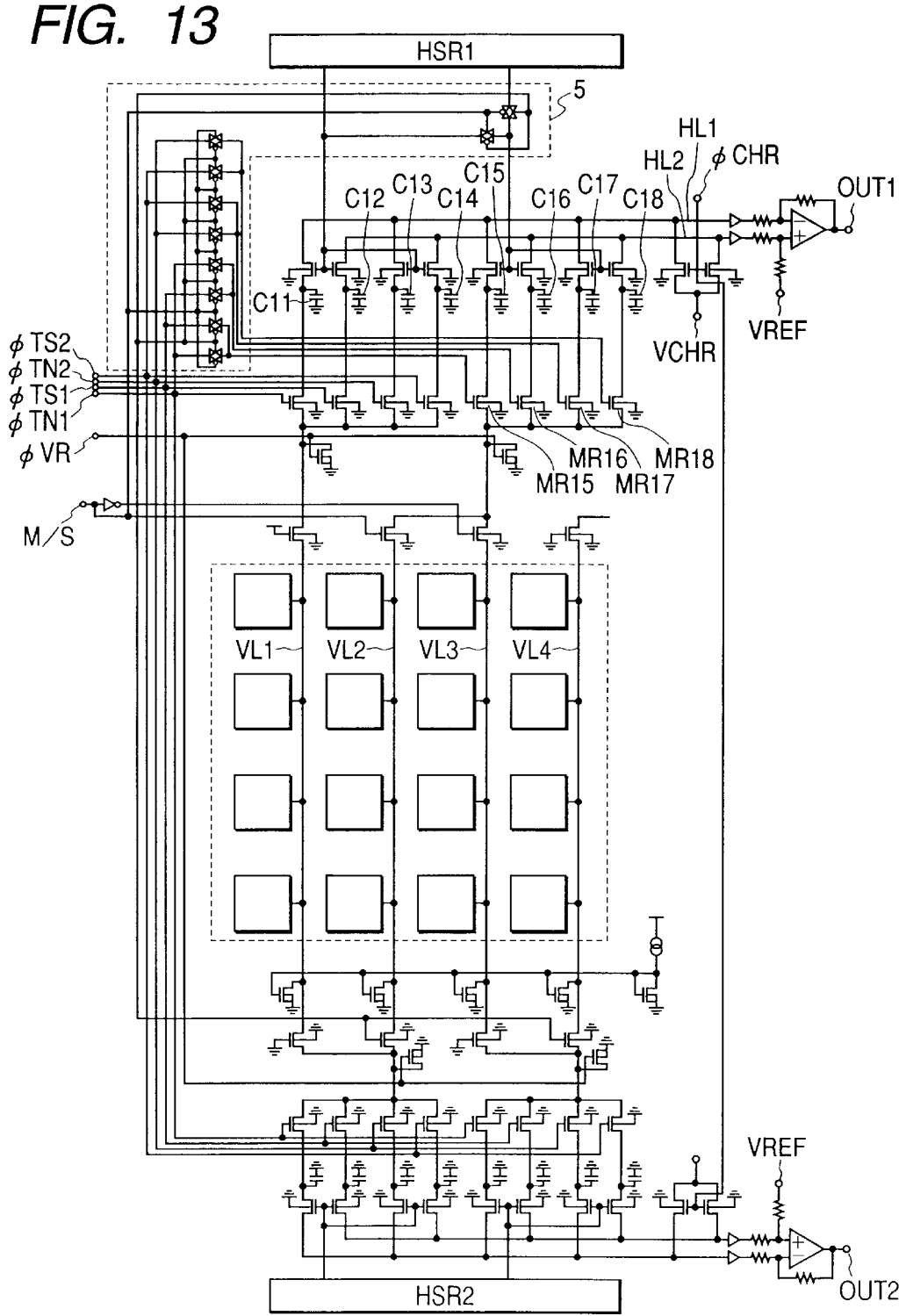
FIG. 13 is a diagram of a pixel array and read-out systems of a solid state image pickup device according to the second embodiment of the invention.
Figure 16:
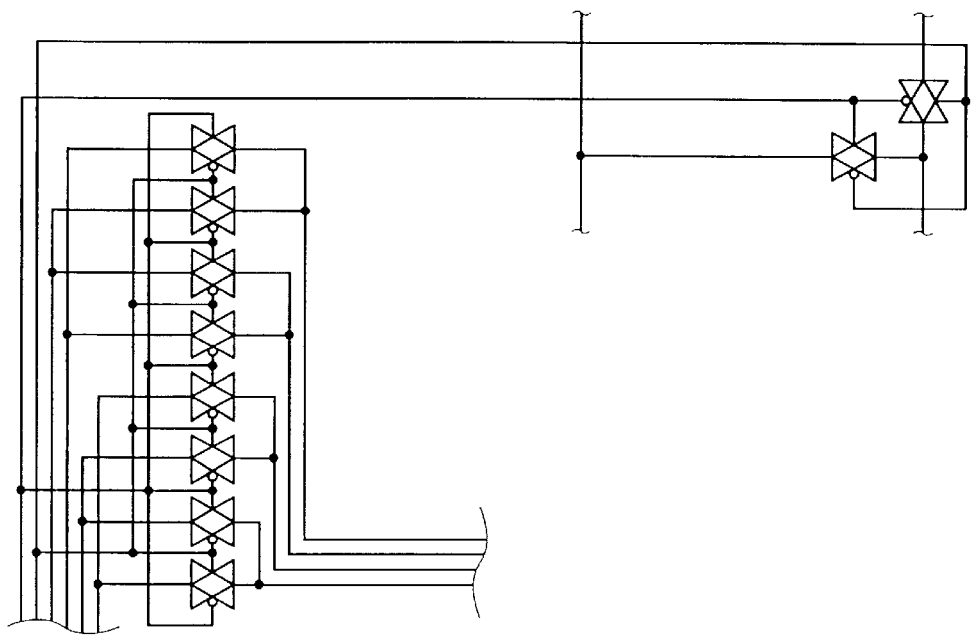
FIG. 16 is a diagram showing the configuration of a switch block shown in FIG. 13.

FIG. 13 is a diagram showing the pixel array and read-out systems of a solid state image pickup device according to the second embodiment of the invention. FIG. 16 is a diagram showing the configuration of a switch block 5 shown in FIG. 13. The second embodiment has the switch block 5 added to the configuration of the solid state image pickup device shown in FIG. 7. The switch block 5 controls the MOS transistors MR15 to MR18 by the signals φTN1, φTS1, φTN2, and φTS2 so that the signal stored in the capacitor C15 is exchanged with the signal stored in the capacitor C16 and the signal stored in the capacitor C17 is exchanged with the signal stored in the capacitor C18 (noise and sensor signals are stored being exchanged with each other), and that signals in the capacitors C11 to C18 are read at the same time. The components other than the switch block 5 are the same as those shown in FIG. 7, and so the identical reference numerals in FIG. 13 and the description of the identical components are omitted.

The still image mode is operated in the manner similar to the first embodiment, with the circuit interconnection similar to that shown in FIG. 7 obtained under the control of the switch block 5.

In the moving image mode, the following points are different from the first embodiment. The turn-on/off of the MOS transistors MR15 to MR18 is reversed with respect to the first embodiment. In first row pixel read, the noise signal in the first row, second column pixel is read into the capacitor C16 and the sense signal in the first row, second column pixel is read into the capacitor C15, and in the second row pixel read, the noise signal in the second row, second column pixel is read into the capacitor C18 and the sense signal in the second row, second column pixel is read into the capacitor C17 (the fifth and sixth row pixels and following row pixels are read in a similar manner).

Therefore, the noise and sensor signals (N11 and S11) in the first row, first column pixel are stored in the capacitors C11 and C12, respectively, and the noise and sensor signals (N21 and S21) in the first row, second column pixel are stored in the capacitors C16 and C15. The noise and sensor signals (N21 and S21) in the second row, first column pixel are stored in the capacitors C13 and C14, respectively, and the noise and sensor signals (N22 and S22) in the second row, second column pixel are stored in the capacitors C18 and C17.

During the signal output period T16, a concurrent read for the first and second column pixels is performed so that the signals in the capacitors C11, C13, C15, and C17 are read to the horizontal output line HL1 to output (N11+N21+S12+S22) and that the signals in the capacitors C12, C14, C16, and C18 are read to the horizontal output line HL2 to output (S11+S21+N12+N22).

Therefore, the following signal is output from the output terminal OUT1:

(S11+S21+N12+N22)−(N11+N21+S12+S22)=(S11+S21)−(S12+S22)+(N12+N22)−(N11+N21)

With reference to the layout of color filters shown in FIGS. 6A and 6B, a signal (Ye+G)−(Cy+Mg) is output from the output terminal OUT1, which signal is a signal (Ye+G) from the first column pixels subtracted by a signal (Cy+Mg) from the second column pixels, and is the color difference signal −(B−Y).

After the third and fourth rows are skipped, similar operations are performed for the fifth and sixth rows to thereby obtain a signal (Ye+Mg)−(Cy+G), i.e., the color difference signal (R−Y). This is illustrated in FIG. 12 as (2) OUT1, OUT2: OFF.

Figure 14:
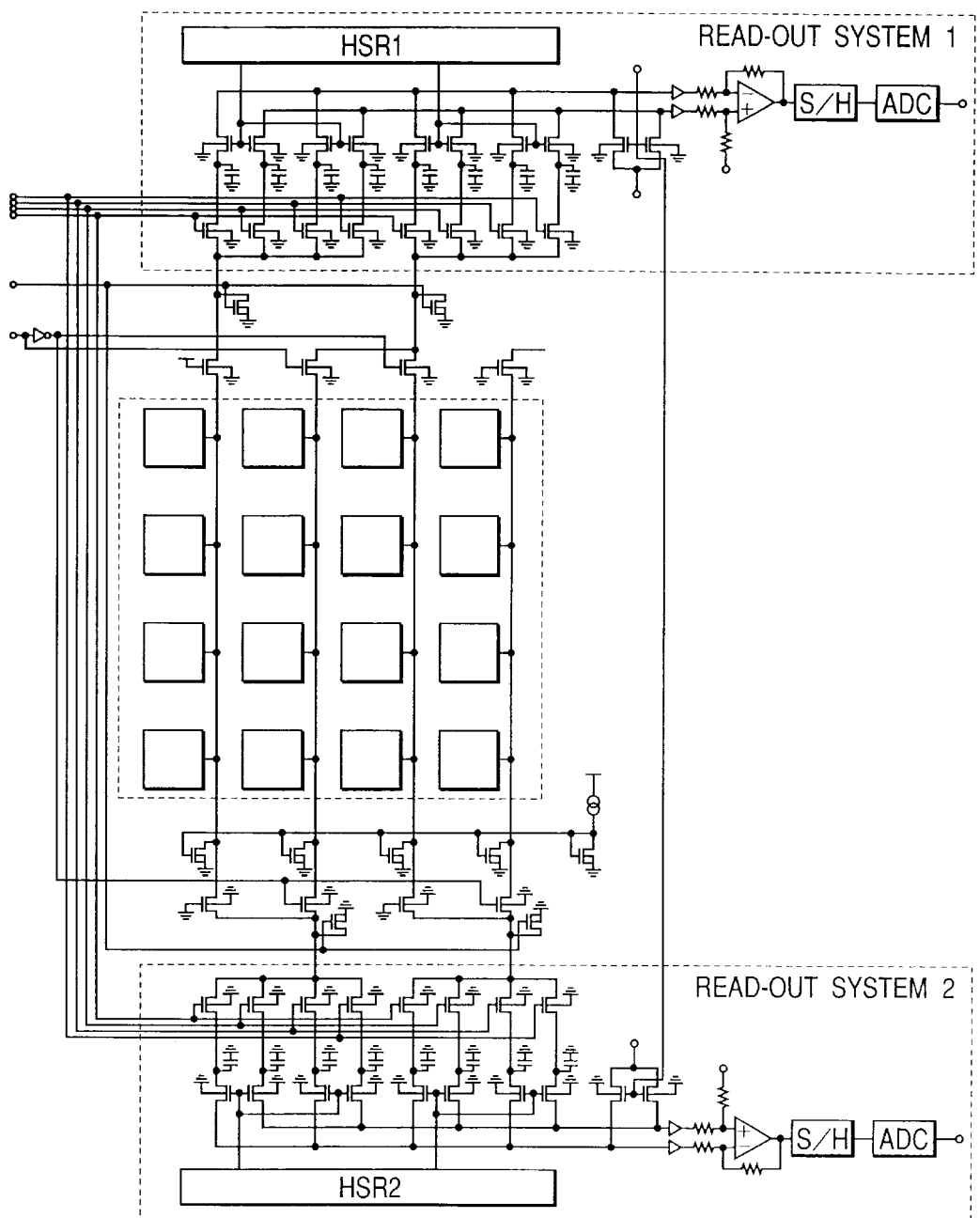
FIG. 14 is a diagram of a pixel array and read-out systems of a solid state image pickup device according to third embodiment of the invention.

FIG. 14 shows the third embodiment of the invention. As compared to the configuration of the solid state image pickup device shown in FIG. 7, the read-out systems 1 and 2 are each provided with a sample/hold circuit (S/H) and an analog/digital converter circuit (ADC). When signals are read by using only the read-out system 1, power sources connected to the sample/hold circuit (S/H) and analog/digital converter circuit are also turned off to reduce the power consumption.

In the first to third embodiments described above, a pixel skip read of two-row and two-column in the row and column directions is performed by using color filters having the layout shown in FIGS. 6A and 6B. The invention is not limited only to the two-row and two-column pixel skip read, but any other pixel skip read may be applied depending upon the layout of color filters to be used.

For example, if the layout of color filters shown in FIG. 15A is used, signal processing illustrated in FIG. 15B is performed so that every four columns are skipped in the column direction and every one row is skipped in the row direction, or signal processing illustrated in FIG. 15C is performed so that every two columns are skipped in the column direction and every four rows are skipped in the row direction. Obviously, a four-row and four-column pixel skip read may be performed.

In the above description, although an area sensor having pixels disposed in the row and column directions is used, the invention is not limited only to the area sensor. For example, if a line sensor is used and an even number pixel read-out system and an odd number pixel read-out system are used in order to increase an output rate, both the read-out systems are used in a high resolution mode and one of the read-out systems is used in a low resolution mode.

As described in detail so far, according to the first to third embodiments, in a drive mode of reading all pixels, a plurality of read-out systems are used for divisionally reading all the pixels to speed up the read rate, whereas in a drive mode of reading pixels by skipping some pixels, the number of read-out systems is reduced so that the power consumption can be reduced and a variation in signal levels to be caused by a variation in characteristics of elements can be suppressed.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:

a plurality of pixels arranged two-dimensionally in a horizontal direction and a vertical direction;

a plurality of vertical output lines each of which is provided in common for every plurality of pixels arranged in the vertical direction;

a plurality of horizontal output lines connected to said plurality of vertical output lines through a plurality of switches, for outputting sequentially signals from said plurality of vertical output lines, wherein said plurality of horizontal output lines are arranged so as to face each other with the pixels being disposed therebetween; and a scanning circuit, arranged to read out signals to said plurality of vertical output lines for every plurality of pixels arranged in the horizontal direction, wherein said image pickup apparatus has a first drive mode so that signals from first pixels arranged in the horizontal direction are read out to said plurality of horizontal output lines by turning on first switches of said plurality of switches, before signals of second pixels arranged in the horizontal direction are read out to said plurality of vertical output lines, and has a second drive mode so that second switches of said plurality of switches, the number of which is less than that of the first switches, are turned on and a lesser number of the horizontal output lines are used than in the first drive mode, thereby reading out signals from the pixels arranged in the horizontal direction, the number of the pixels being less than that of the pixels read out in the first drive mode.

2. An apparatus according to claim 1, wherein in the second drive mode, the lesser number of the pixels arranged in the vertical direction are also read out in comparison with the first drive mode.

3. An apparatus according to claim 1, further comprising a switch circuit arranged to transfer signals of the pixels connected to at least one horizontal output line to another horizontal output line.

4. An apparatus according to claim 1, wherein the second drive mode effects control as to the pixels arranged in the horizontal direction so that electric power of at least one of said plurality of horizontal output lines is turned off or current consumption of said at least one of said plurality of horizontal output lines is reduced.

5. An apparatus according to claim 1, wherein the first drive mode is a drive mode for a still image, and the second drive mode is a drive mode for a moving image.

6. An apparatus according to claim 1, wherein as to the pixels arranged in the horizontal direction, the second drive mode effects control of read-out in a row direction and a column direction so that two rows are read out and the next two rows are skipped, while two columns are read out and the next two columns are skipped, and wherein signals of said two rows are added together to be outputted.

* * * * *

UNITED STATES PATENT AND TRADEMARK OFFICE
CERTIFICATE OF CORRECTION

PATENT NO. : 6,784,928 B1
DATED : August 31, 2004
INVENTOR(S) : Katsuhito Sakurai et al.

It is certified that error appears in the above-identified patent and that said Letters Patent is hereby corrected as shown below:

<u>Column 4,</u>
Line 25, "vertical." should read -- vertical --.
Line 49, "; system" should read -- system --.

<u>Column 5,</u>
Line 21, "Y = {(Ye+G)+(Cy+Mg)}/2-(B-Y) = (Ye+G)-(Cy+Mg)" should read
-- Y = {(Ye+G)+(Cy+Mg)}/2 ¶
   -(B-Y)=(Ye+G)-(Cy+Mg) --.

Signed and Sealed this

Second Day of November, 2004

JON W. DUDAS
*Director of the United States Patent and Trademark Office*